United States Patent
Nakamura et al.

[11] Patent Number: 5,924,724
[45] Date of Patent: Jul. 20, 1999

[54] AIRBAG SYSTEM

[75] Inventors: Junichi Nakamura, Anjo; Tsutomu Ookochi, Okazaki; Noritaka Nagayama, Okazaki; Mikiharu Shimoda, Okazaki, all of Japan

[73] Assignee: Mitsubishi Jidosha Kogyo Kabushiki Kaisha, Tokyo, Japan

[21] Appl. No.: 08/938,837

[22] Filed: Sep. 26, 1997

[30] Foreign Application Priority Data

Sep. 27, 1996 [JP] Japan ................................. 8-256336

[51] Int. Cl.⁶ ................................................ B60R 21/22
[52] U.S. Cl. ................................. 280/730.2; 280/730.1; 280/743.1
[58] Field of Search .......................... 280/730.2, 730.1, 280/728.1, 743.1; 297/216.13, 216.1

[56] References Cited

U.S. PATENT DOCUMENTS

| | | | |
|---|---|---|---|
| 3,767,229 | 10/1973 | Cain | 280/732 |
| 5,382,051 | 1/1995 | Glance | 280/730.2 |
| 5,458,366 | 10/1995 | Hock et al. | 280/729 |
| 5,544,913 | 8/1996 | Yamanashi et al. | 280/730.2 |
| 5,586,782 | 12/1996 | Zimmerman, II et al. | 280/730.2 |
| 5,615,914 | 4/1997 | Galbraith et al. | 280/730.2 |
| 5,653,465 | 8/1997 | Ferrero | 280/753 |
| 5,667,242 | 9/1997 | Slack et al. | 280/730.2 |

FOREIGN PATENT DOCUMENTS

| | | | |
|---|---|---|---|
| 0314645 | 12/1989 | Japan | 280/730.2 |
| 2267065 | 11/1993 | United Kingdom | 280/730.2 |

*Primary Examiner*—Christopher P. Ellis

[57] ABSTRACT

An airbag system provided in a vehicular seat that includes a cushion pad member, comprises an inflator contained in the cushion pad member and adapted to generate gas when a vehicle is subjected to a side impact, and a seat covering member covering the cushion pad member. The covering member is designed to spread out like a bag between an occupant and the body of the vehicle by the gas generated by the inflator.

14 Claims, 5 Drawing Sheets

AIRBAG SYSTEM

BACKGROUND OF THE INVENTION

The present invention relates to an airbag system for protecting the body of an occupant in a seat when a vehicle is subjected to a lateral impact force.

In airbag systems for vehicles that are practically used these days, an airbag is contained folded in a center pad of a steering wheel or a instrument panel of the vehicle on the passenger-seat side. According to the airbag systems of this type, the body of an occupant in the vehicle is caught on the airbag that is inflated in an instant by gas when the vehicle undergoes a head-on collision. The airbag serves to absorb the forward force of inertia that acts on the occupant and prevents the occupant from suffering a second collision with the steering wheel, instrument panel, etc.

Also, there have been developed side airbag systems in which an airbag is contained folded in a seat or a side face of a cabin of a vehicle, e.g., the inside of a door. When the vehicle undergoes a side impact, the airbag of one such side airbag system is inflated in an instant by gas, thereby preventing an occupant in the vehicle from suffering a secondary collision with the inside of the door or the like.

When the vehicle is subjected to a lateral impact force, an inside wall of the vehicle body moves toward the center of the cabin or the side opposite to the impact side. Also, a seat cushion, along with a side sill and the floor, moves toward the center of the cabin. Since the body of the occupant seated on the seat cushion is not fixed to the cushion, however, it is induced to stay where it is by the force of inertia. As the inside wall of the vehicle body, moving toward the center of the cabin, approaches the occupant, therefore, they may possibly undergo a secondary collision with each other. The side airbag system serves to maintain the safety of the occupant's body in case of such a side impact of the vehicle.

FIGS. 8, 9 and 10 show a conventional seat-mounted side airbag system. This airbag system is attached to a passenger seat that includes a seat cushion 1 and a seat back 2. A space section 4 surrounded by a pad member 3 is formed in a flank portion of the seat back 2 on the door side. The space section 4 contains therein an airbag module 7, which includes an inflator 5, an airbag 6, etc. The pad member 3 of the seat back 2 is covered by a covering 8. A front covering 8a and a side covering 8b of the covering 8 are stitched together at a corner stitch portion 8c of the pad member 3. Thus, the pad member 3 is concealed under the covering 8 including this stitch portion 8c.

The airbag system described above is provided with a sensor (not shown) for detecting the force of a side impact on a vehicle. When the sensor detects a lateral impact force on the vehicle, it gives an operational command to the inflator 5. Thereupon, the inflator 5 is actuated so that an inflating gas such as nitrogen gas therefrom is introduced in an instant into the airbag 6. This inflating gas causes the airbag 6 to break the stitch portion 8c and inflate, as indicated by two-dot chain line in FIG. 8.

As shown in FIGS. 9 and 10, a lower half 6a of the airbag 6 bulges out between a trunk 10a of an occupant 10 and an inside wall 6c of the vehicle body. An upper half 6b of the airbag 6 inflates between a head 10b of the occupant 10 and the inside wall 6c of the vehicle body. Thus, the upper half (trunk 10a and head 10b) of the body of the occupant 10 can be prevented from undergoing a second collision with the inside wall 6c. Airbag systems constructed in this manner are described in Jpn. Pat. Appln. KOKAI Publication Nos. 6-227348, 8-67228, etc., for example.

As described above, the conventional seat-mounted side airbag system has the space section 4 in the door-side flank portion of the seat back 2, and the inflator 5 and the airbag 6 are housed in the space section 4. Also, the space section 4 contains a regulating member 5' for restricting the inflating direction of the airbag 6. Further, the pad member 3 is concealed by stitching the front and side coverings 8a and 8b together at its corner stitch portion 8c.

The seat back 2 is stuffed with the pad member 3 in order to improve the comfortableness of the seat for the occupant. To attain this, the airbag 6 must be contained folded compactly in a limited space inside the seat back 2. This narrow space is also expected to contain the inflator 5 and the regulating member 5' for restricting the inflating direction of the airbag 6, as well as the airbag.

Thus, the airbag system arranged in this manner entails use of a large number of components, complicated construction, and a lot of assembling processes, resulting in an increase in cost. In order to protect a wide area of the occupant's body ranging from the trunk 10a to the head 10b by means of the single airbag 6, moreover, the airbag must be securely bulged toward a space between the body of the occupant 10 in the seat and the inside wall 6c of the vehicle body. Accordingly, the shape of the airbag 6 is complicated, and it is difficult to inflate the airbag into an optimum shape by introducing the gas in an instant into all parts of the airbag.

BRIEF SUMMARY OF THE INVENTION

Accordingly, the object of the present invention is to provide an airbag system capable of satisfactorily absorbing the energy of impact on the trunk and head of an occupant in a seat of a vehicle when the vehicle is subjected to a lateral impact force, thereby protecting the occupant securely and safely, and having a simple construction with fewer components, thus ensuring a reduction in cost.

An airbag system according to the present invention comprises an inflator contained in a cushion pad member of a seat of a vehicle, such as an automobile, and adapted to generate gas when the vehicle is subjected to a side impact, and a seat covering member covering the cushion pad member and capable of being inflated into a cabin of the vehicle and spread out like a bag between an occupant and the body of the vehicle by the gas generated by the inflator. The "airbag" stated herein implies a member that is inflated like a bag with gas such as nitrogen gas, and it is to be understood that the gas used to inflate the airbag is not limited to air.

The airbag system of the invention is designed such that a sensor senses an impact force and gives an operational command (electrical signal) to the inflator when the vehicle is subjected to a side impact. In response to this command, an electrical firing device of the inflator is actuated to ignite a firing agent, whereupon a gas generating agent, such as sodium nitride, burns quickly. The gas generated in this manner is ejected into the pad member, and causes the seat covering member, which covers the pad member, to inflate like a bag into the cabin. Thus, the seat covering member inflated between the occupant's body and an inside wall of the vehicle body serves as an airbag, thereby absorbing the energy of a secondary collision between the upper half (trunk and head) of the occupant's body and the inside wall of the vehicle body. Thus, according to the present invention, the occupant's body can be securely protected in case of a side impact, and the secondary collision between the occupant's body and the inside wall of the vehicle body can be prevented. Since the seat covering member itself is inflated, moreover, there is no need of an independent airbag and a retainer for holding the airbag in a folded state, which are requisite for the conventional systems. As compared to the conventional side airbag systems, therefore, the system of the invention has a simpler construction, uses fewer components, and is easier to assemble, thus ensuring a reduction in cost.

Preferably, according to the present invention, a stretchable material, such as a knit fabric, is used for the seat covering member. With use of the knit fabric, the covering member can enjoy a higher extension percentage, as well as the aforementioned effects. Thus, the covering member can be inflated generously by the gas, and can, therefore, securely protect the occupant's body.

According to the present invention, a fragile portion may be formed in a part of the seat pad member, that is, in a position corresponding to the region where the pad member is to be inflated. Preferably, the fragile portion is located in the direction for the gas to be ejected from the inflator. Thus arranged in the pad member, the fragile portion ensures the aforementioned effects, and besides, enables an intended region of the seat covering member to inflate reliably.

According to the present invention, the cushion pad member has a space section for holding the inflator therein, and the inner surface of the pad member, which defines the space section, is formed having a protective layer for preventing leakage of the gas. Preferably, the cushion pad member includes a fragile portion in a position where the gas generated by the inflator is to be ejected toward a region between the flank of the occupant's body and the inside wall of the vehicle body. The protective layer may be formed over the whole inner surface of the cushion pad member except the fragile portion. More specifically, the protective layer may be formed over the whole area of the inner surface of the cushion pad member except the region in the direction for the gas to be guided to the covering member. With this arrangement, the inflating gas from the inflator can be reliably ejected toward a target region without being scattered towards any other regions.

According to the present invention, the seat covering member may be designed to be inflated like a bag toward a space between the occupant's body in the seat and the inside wall of the vehicle body by the gas ejected from the inflator. Preferably, the inflator includes a guide member for guiding at least some of the gas in a predetermined direction. The inflator thus constructed can reliably settle the inflating direction of the seat covering member in a manner such that the inflating gas ejected from the inflator is controlled in direction.

According to the present invention, moreover, the guide member is in the form of a box-shaped member surrounding the inflator and having a gas jet opening toward the fragile portion. According to the present invention, furthermore, the gas jet has an open edge in contact with the inner surface of the cushion pad member at the fragile portion. Moreover, the guide member is connected to a gas generating section of the inflator and opens toward the fragile portion.

Preferably, the seat covering member is inflated into a shape such that it can screen the trunk of the occupant's body from the inside wall of the vehicle body. It is advisable, moreover, to inflate the covering member into a shape such that it can screen a region of the occupant's body ranging from the head to the side portion of the trunk from the inside wall of the vehicle body. Arranged in this manner, the seat covering member ensures the aforementioned effects, and besides, can absorb the impact of a secondary collision between the occupant's body and the inside wall of the vehicle body by bulging out into the space between them.

Additional objects and advantages of the present invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Preferred embodiments of the present invention will now be described in detail with reference to the accompanying drawings.

Figure 1:
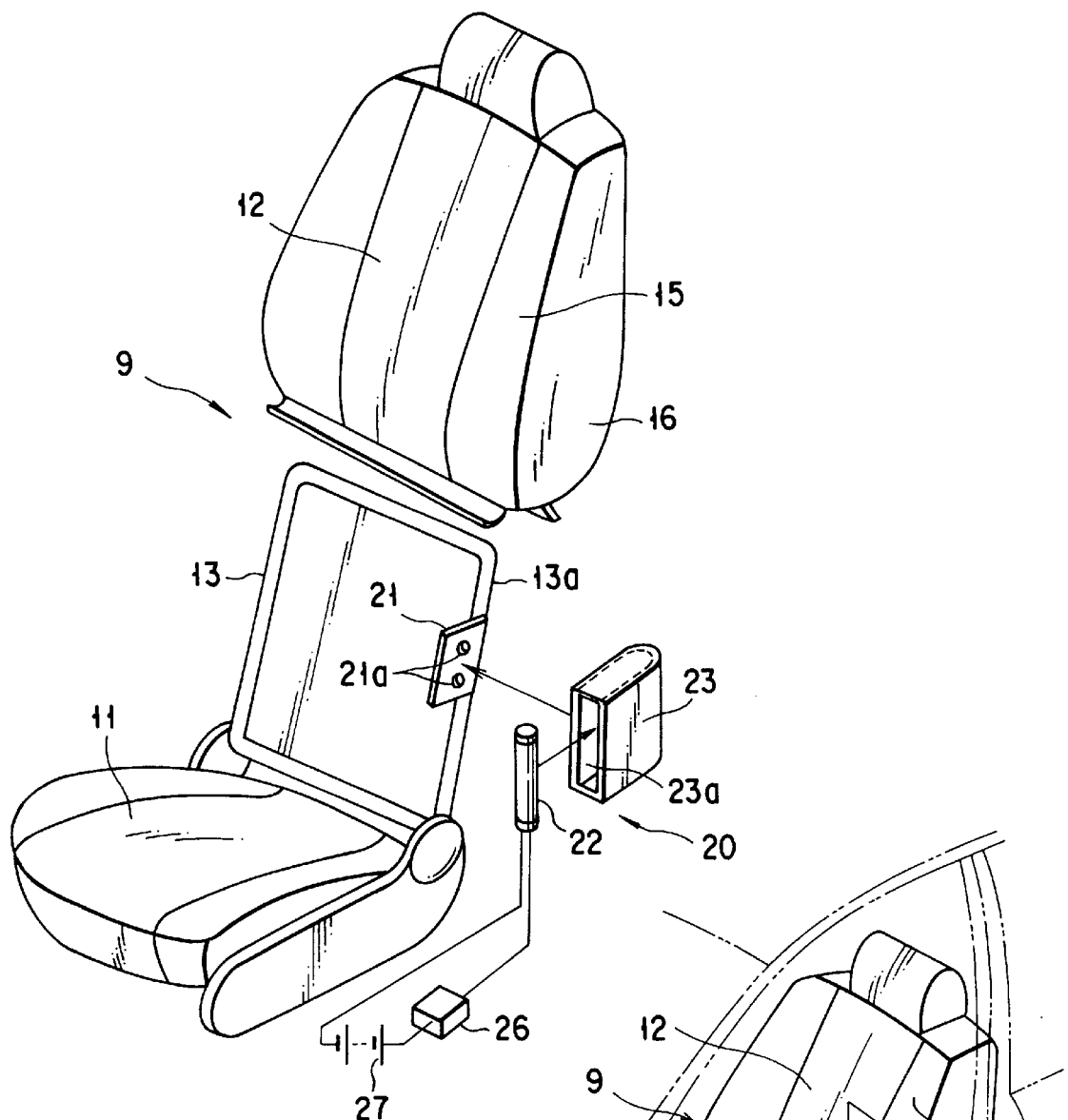
FIG. 1 is an exploded perspective view of a seat containing an airbag system according to a first embodiment of the present invention.
Figure 2:
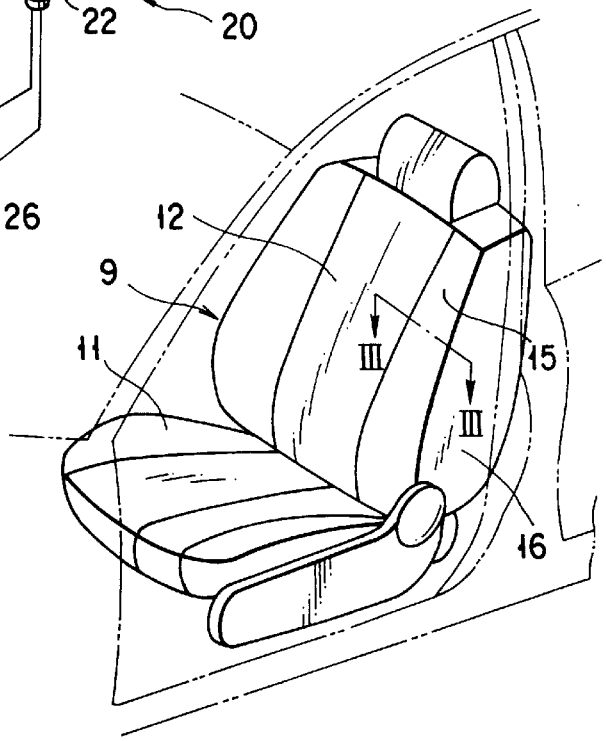
FIG. 2 is a perspective view of the seat containing the airbag system shown in FIG. 1.

FIGS. 1 to 5 show a first embodiment of the invention. A passenger seat 9 shown in FIG. 1 is provided with a seat cushion 11 and a seat back 12. The seat back 12 comprises a seat frame 13, an elastic cushion pad member 14 fixed together with a spring (not shown) on the frame 13, and a seat covering member 15 covering these components.

Figure 6:
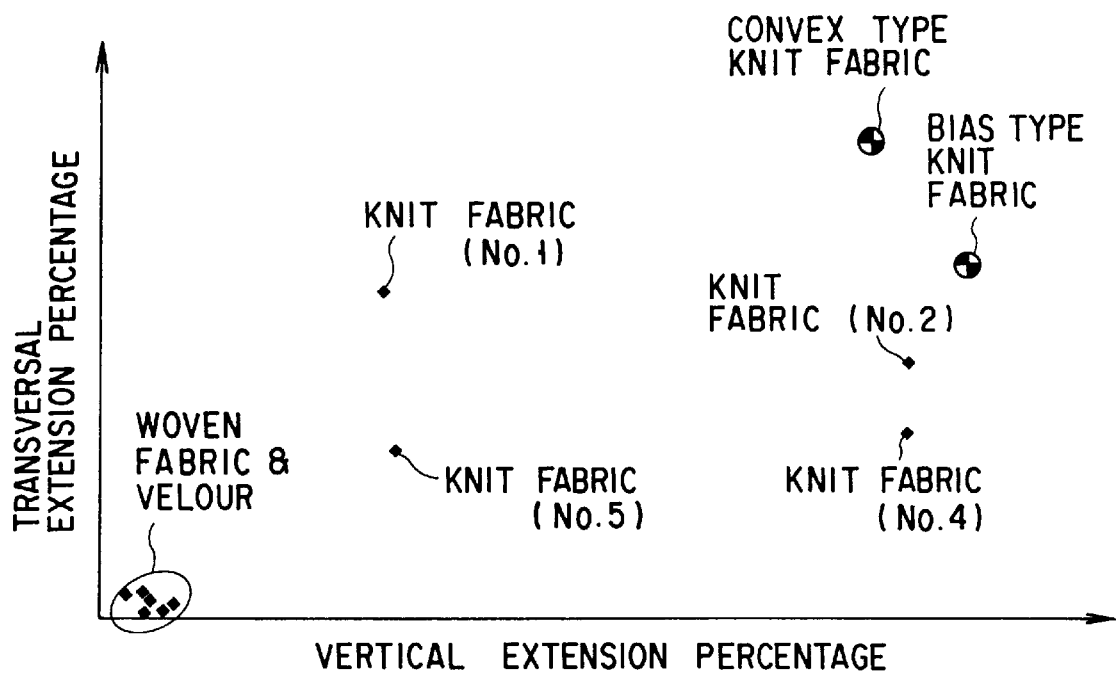
FIG. 6 is a diagram showing the extension percentages of materials used for the seat covering member.

The seat covering member 15 is formed of a highly stretchable material, e.g., a knitted material such as a bias knit fabric. (Bias knit fabric is a product on which diagonal weave appears when viewed at a particular angle.) The following is a description of the extension percentages of the seat covering member 15. In FIG. 6, the axes of ordinate and abscissa represent transversal and vertical extension percentages, respectively. As shown in FIG. 6, woven-fabric and velour materials exhibit very small values for both the transversal and vertical extension percentages. Compared with these materials, knitted materials No. 1, No. 2, No. 4, and No. 5 of four types in different forms have higher extension percentages. A bias knit fabric, such as a jersey knit fabric, and a convex knit fabric, in particular, have higher extension percentages than the knitted materials No. 1, No. 2, No. 4, and No. 5. (Jersey knit fabric has a relatively great extension percentage and hardly has creases if used as the seat covering member 15. Convex knit is a product which has raised weave.) In general, therefore, these knit fabrics, such as the bias knit fabric, such as the jersey knit fabric and the convex knit fabric, are preferred materials for the seat covering member 15 to be used according to the present embodiment.

Figure 3:
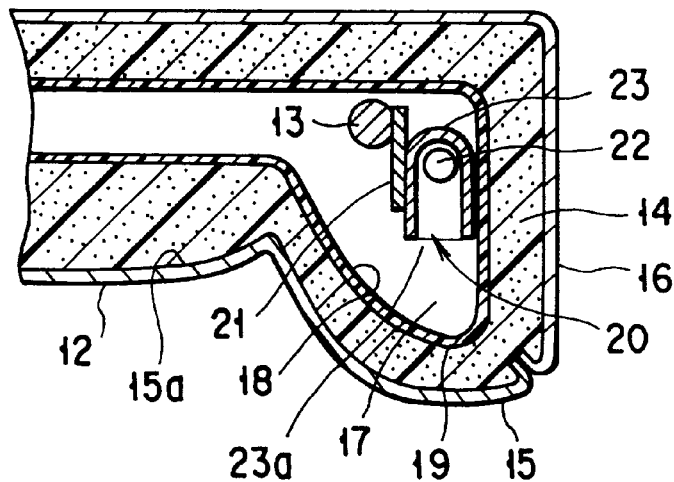
FIG. 3 is a partial sectional view of the seat taken along line III—III of FIG. 2.
Figure 4:
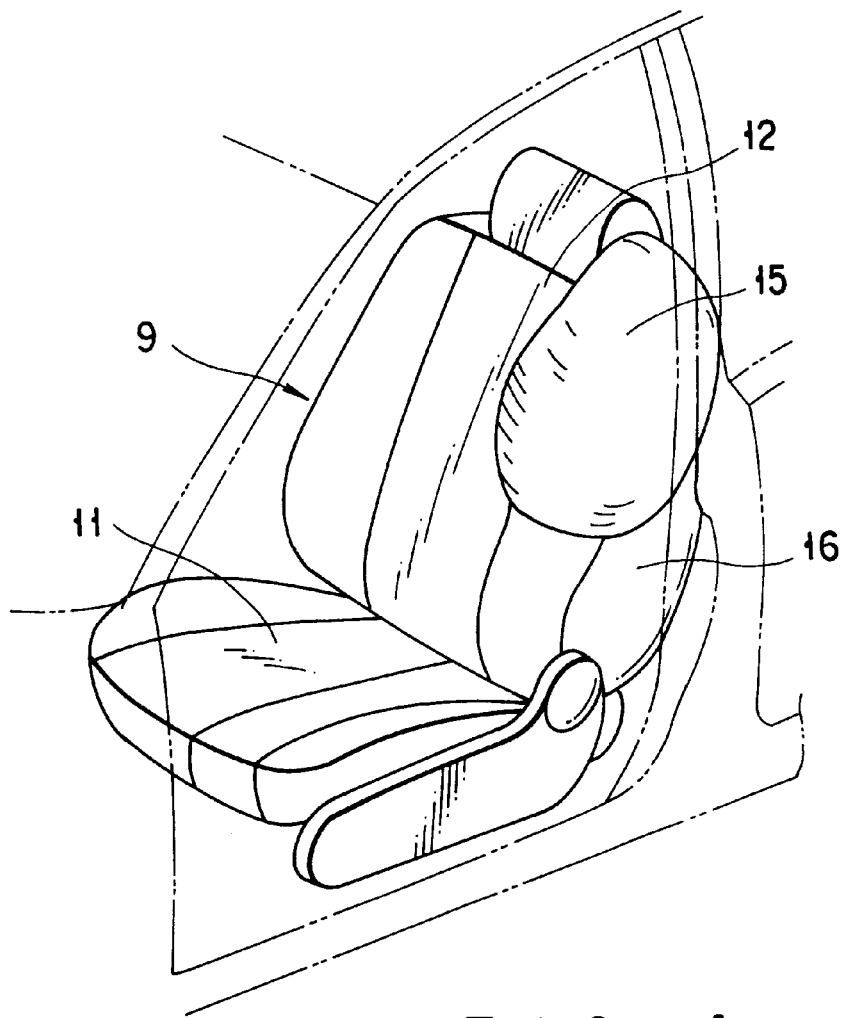
FIG. 4 is a perspective view of the seat shown in FIG. 1, in which a seat covering member is inflated.

Surrounded by the cushion pad member 14, as shown in FIG. 3, a space section 17 is formed substantially in the vertical middle portion (i.e., a region corresponding to the height of the chest of an occupant seated on the seat cushion 11) of a side portion 16 of the seat back 12, that is, a side wall facing the vehicle-door side. The inner surface of the cushion pad member 14, which defines the space section 17, is coated with a protective layer 18 of a resin, such as nylon, in order to prevent a gas leakage. The protective layer 18 serves to keep the gas permeability of the pad member 14 at, for example, 0.41 cc/cm$^2$/s or less.

An airbag module 20 is contained in the space section 17. The module 20 includes a base 21 that is formed of a metal plate. The base 21, which extends in the vertical direction, is fixed to a longitudinal side frame component 13a of the seat frame 13. The base 21 is provided with two mounting holes 21a that are spaced vertically.

An outer casing 23 is provided on the front portion of the base 21. The casing 23 holds therein an inflator 22 for generating an inflating gas such as nitrogen gas. The casing 23 serves also as a guide member for restricting the direction of ejection of the inflating gas. The outer casing 23 is in the form of a box obtained by bending a rectangular metal plate substantially into the shape of a U in section such that only its front portion is open with its top and bottom ends both closed. A side face of the casing 23 is fixed to the base 21 by means of fixing members, such as bolts, that are screwed in the mounting holes 21a, individually. When the inflating gas is generated, the inflator 22 ejects the gas substantially in all directions covering its circumference. However, the outer casing 23 controls the inflating gas such that the gas is directed toward the front of the vehicle and diagonally upward.

A fragile portion 19 is provided in front of the outer casing 23, that is, in the direction for the inflating gas to be ejected from the inflator 22. The fragile portion 19 is formed by reducing the thickness of part of the combination of the protective layer 18 and the cushion pad member 14 or by previously forming a crack therein. Thus, the portion 19 is a little more fragile than any other regions, so that the protective layer 18 and the pad member 14 can be broken starting at the fragile portion 19 under the pressure of the gas ejected from the inflator 22. An ignition system for the inflator 22 is connected with a sensor 26 for detecting side impact and a vehicle-mounted battery 27 for use as a power source.

The outer casing 23, which functions as a guide member, is a box-shaped member surrounding the inflator 22, and a gas jet 23a opens in its front portion. The jet 23a is directed toward the fragile portion 19 of the cushion pad member 14. If necessary, the inner surface of the seat covering member 15 may be coated with a stretchable lining 15a for preventing leakage of the gas.

The following is a description of the airbag system constructed in this manner.

If the vehicle is subjected to a lateral impact force, the sensor 26 for detecting side impact senses the impact force and gives an operational command to the inflator 22. In response to this command, powder for a firing agent in the inflator 22 is ignited, and the inflating gas, such as nitrogen gas, is ejected from the inflator. The ejected gas is directed toward the front of the vehicle in a manner such that the direction of its ejection is restricted by the outer casing 23.

Thus, the fragile portion 19 of the protective layer 18 and the cushion pad member 14 breaks by the pressure of the gas ejected from the inflator 22. This gas is delivered in an instant to the inner surface of the seat covering member 15. Thereupon, the door-side region of the covering member 15 in the seat back 12 is stretched and inflated like a bag toward the front of the vehicle. Then, the covering member 15, inflated like a bag in this manner, inflates into a space between the trunk of the occupant in the seat and the inside wall of the vehicle body. Thus, when the vehicle is subjected to a side impact force, the seat covering member 15 itself is inflated to serve as an airbag, thereby protecting the body of the occupant. The member 15 also inflates upward after it is inflated toward the front of the vehicle. By doing this, the covering member 15 inflates into a space between the head of the occupant in the seat and the inside wall of the vehicle body.

Figure 5A:
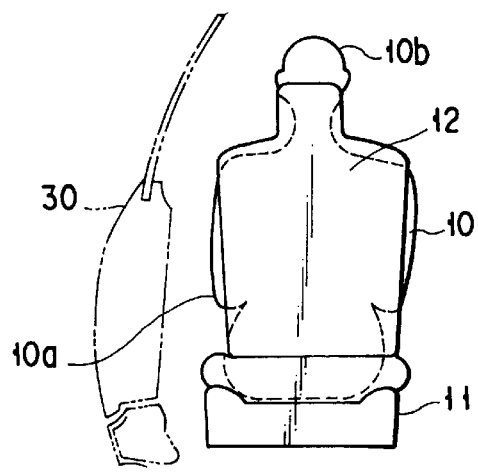
FIGS. 5A, 5B, 5C, 5D and 5E are rear views of the seat for illustrating the function of the airbag system shown in FIG. 1.
Figure 5B:
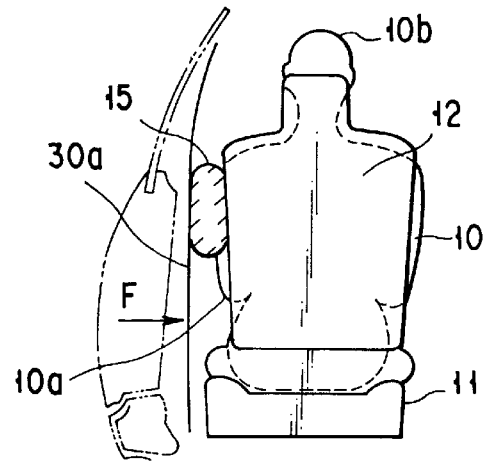
Figure 5C:
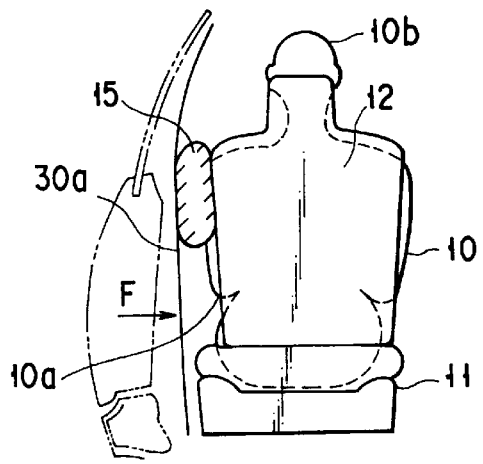

FIGS. 5A to 5E are views taken from behind the passenger seat and individually showing states in the vehicle established when the vehicle is subjected to a side impact force. FIG. 5A shows a normal state before the side impact. When the vehicle laterally receives an impact force F, as shown in FIG. 5B, an inside wall 30 of the vehicle body moves toward the center of the cabin or the side opposite to the impact side. Thus, the inside wall 30 moves to a position 30a indicated by full line in FIG. 5B. When the inside wall 30 is subjected to the impact force F, the sensor 26 for detecting impact senses the impact force and gives an operational command to the inflator 22. As this is done, the powder in the inflator 22 is ignited, and the inflating gas, such as nitrogen gas, is ejected. Since this gas is delivered in an instant to the inside of the seat covering member 15, the member 15 is inflated toward the front of the vehicle body. Thus inflated like a bag, the covering member 15 can absorb the energy of an impact between a trunk 10a of an occupant 10 and the inside wall 30 of the vehicle body, as shown in FIG. 5C.

Figure 5D:
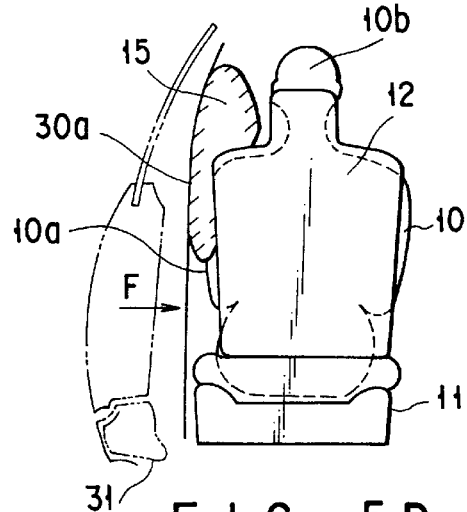
Figure 5E:
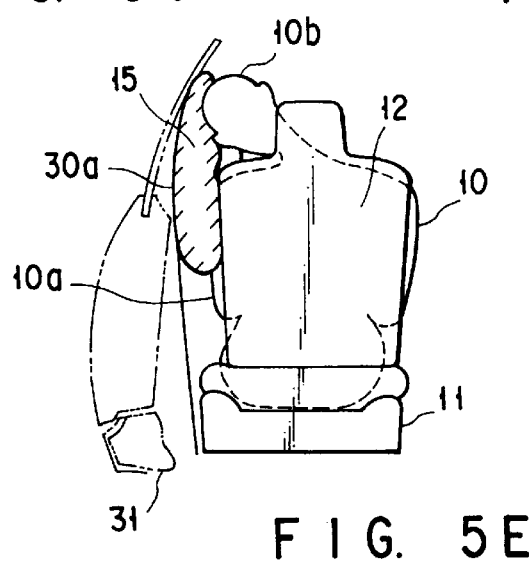

As this is done, the seat cushion 11 is caused to move toward the center of the cabin by a side sill 31 and the floor, as shown in FIGS. 5D and 5E. At the same time, the trunk 10a of the occupant 10 seated on the cushion 11 is pressed by the inside wall 30 of the vehicle body through the inflated seat covering member 15, whereupon it moves toward the center of the cabin. Since the head 10b of the occupant 10 is not fixed to the seat cushion 11 on the other hand, it is induced to stay where it is by the agency of inertia. Accordingly, the head 10b of the occupant 10 relatively approaches the inside wall 30 of the vehicle body that is moving toward the center of the cabin. After the seat covering member 15 is inflated toward the front of the vehicle, however, it is then inflated upward and inflates into the space between the head 10b of the occupant 10 and the inside wall 30 of the vehicle body. By doing this, the covering member 15 absorbs the energy of a secondary collision between the occupant's head 10b and the inside wall 30.

In this manner, the seat covering member 15 is inflated as the body of the occupant 10 and the inside wall 30 of the vehicle body are caused relatively to shift their positions by the force of the side impact. More specifically, the occupant's head 10b and the inside wall 30 relatively approach each other after the occupant's trunk 10a and the inside wall 30 are caused relatively to approach each other by the side impact. As the body of the occupant 10 and the inside wall 30 of the vehicle body relatively shift their positions in this manner, the covering member 15 is inflated to ease the secondary collision between the occupant's body and the inside wall 30.

Since the seat covering member 15 itself serves as an airbag according to the present embodiment, there is no need to provide an independent airbag and a retainer for holding the airbag in a folded state. Thus, the airbag system has a simple construction, its components can be reduced in number, and assembling the system is easy, so that the cost of the system can be lowered.

Figure 7:
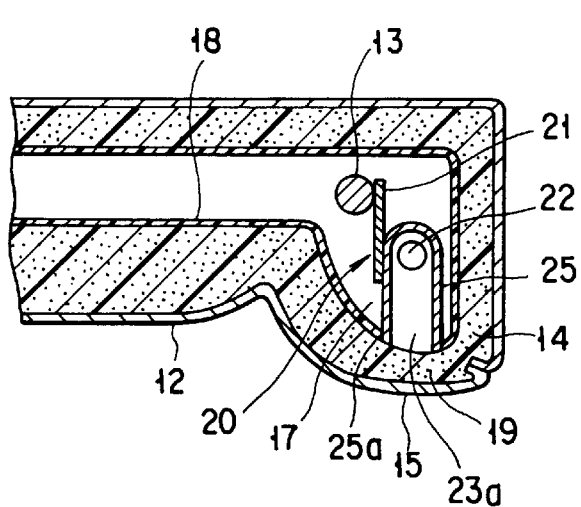
FIG. 7 is a sectional view, similar to FIG. 3, showing a seat containing an airbag system according to a second embodiment of the invention.
Figure 8:
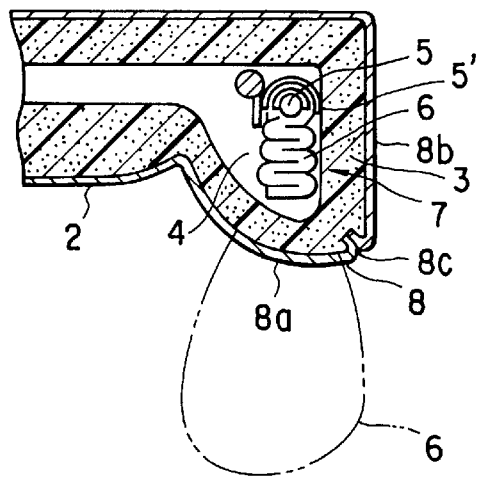
FIG. 8 is a sectional view of a seat furnished with a conventional airbag system.
Figure 9:
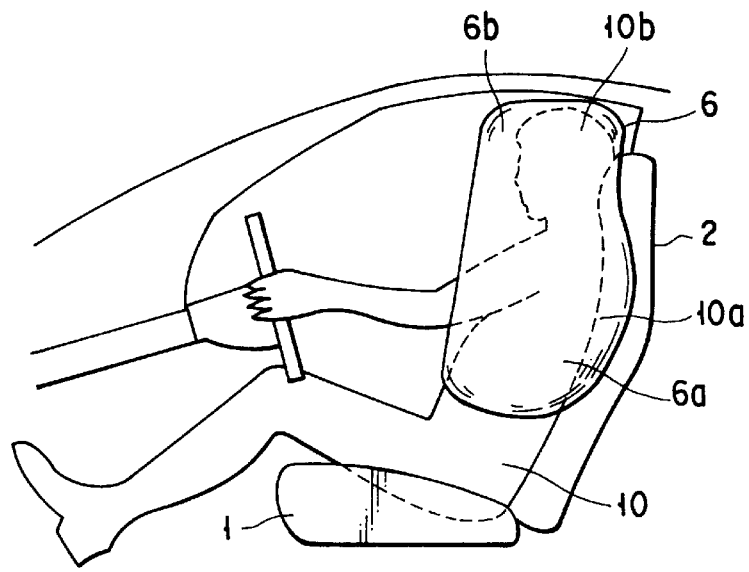
FIG. 9 is a side view illustrating the function of the conventional airbag system.
Figure 10:
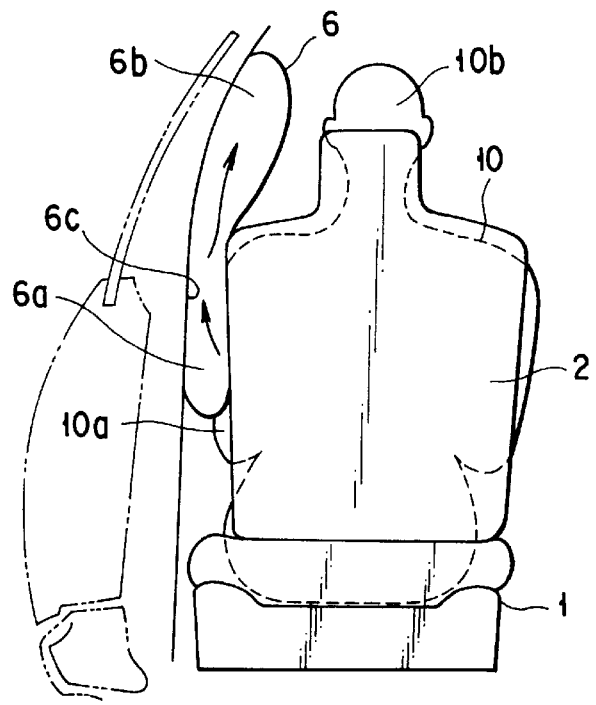
FIG. 10 is a rear view showing illustrating the function of the conventional airbag system.

FIG. 7 shows a second embodiment of the present invention. Like reference numerals are used to designate like portions throughout the drawings, and a description of those portions is omitted. A boundary surface of a space section 17 (or the inner surface of a cushion pad member 14) surrounded by the pad member 14 is coated with a protective layer 18 of a resin such as nylon. An airbag module 20 is contained in the space section 17. The pad member 14 is formed having a fragile portion 19 in the direction of ejection of gas generated by an inflator 22, that is, in a position where the gas is to be ejected toward a region between an occupant's body and the inside wall of a vehicle body. The protective layer 18 is formed over the whole inner surface of the pad member 14 except the fragile portion 19.

The airbag module 20 is provided with an outer casing 25, which holds therein the inflator 22 for generating an inflating gas, such as nitrogen gas, is ejected. The casing 25 serves also as a guide member for restricting the direction of ejection of the gas. The outer casing 25 is in the form of a box obtained by molding a rectangular plate substantially into the shape of a U in section such that only its front portion is open with its top and bottom ends both closed. A gas jet 23a opens toward the fragile portion 19 of the cushion pad member 14. An open edge 25a of the gas jet 23a is in contact with the inner surface of the pad member 14 at the fragile portion 19. Alternatively, the protective layer 18 may be formed over the whole inner surface of the pad member 14. In this case, the outer casing 25 is fixed to a seat frame 13 with its open edge 25a in contact with the protective layer 18.

When the inflating gas is generated, the inflator 22 ejects the gas substantially in all directions covering its circumference. However, the outer casing 25 controls the inflating gas so that the gas is directed toward the front of the vehicle. Besides, the open edge 25a of the casing 25 is in contact with the inner surface of the cushion pad member 14 or the protective layer 18. Accordingly, the inflating gas ejected from the inflator 22 is concentrated on the fragile portion 19 without getting scattered on any other regions. Thus, the fragile portion 19 is broken in an instant by the pressure of the inflating gas ejected from the inflator 22. According to this arrangement, therefore, the response of the airbag system to a side impact can be further improved, and a seat covering member 15 can be inflated in an instant.

According to each embodiment described above, what is inflated is the seat covering member 15 covering the cushion pad member 14 that constitutes a part of the seat back 12. In a seat having a headrest that is integral with the seat back 12, however, the inflating gas ejected from the inflator may be introduced into a seat covering member covering a pad member that constitutes the headrest. According to this arrangement, the seat covering member of the headrest can be inflated together with the seat covering member 15 of the seat back 12 to protect an occupant's head.

According to each embodiment described herein, moreover, the airbag module is contained in the seat back of the passenger seat of the vehicle. However, the same effects as aforesaid can be obtained by incorporating the same airbag module of the embodiment also in the seat back section of a driver's seat.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An occupant protection system provided in a vehicular seat including a cushion pad member, comprising:

an inflator contained in the cushion pad member and adapted to generate and discharge gas towards a specified portion of an inner surface of the cushion pad member, such that the gas makes direct contact with the inner surface of the specified portion of the cushion member, when a vehicle is subjected to an impact; and a seat covering member covering at least an outer surface of the specified portion of the cushion pad member, said seat covering member being capable of inflating between an occupant and the body of the vehicle by the gas generated by the inflator.

2. An occupant protection system according to claim 1, wherein said seat covering member is formed of a stretchable material.

3. An occupant protection system according to claim 2, wherein said seat covering member is formed of a knit fabric.

4. An occupant protection system according to claim 1, wherein said cushion pad member includes a fragile portion, in the specified portion, that tears when the generated gas makes direct contact therewith.

5. An occupant protection system according to claim 1, wherein said cushion pad member has a space section for containing the inflator therein, and the inner surface of the pad member defining the space section includes a protective layer for preventing leakage of the gas.

6. An occupant protection system according to claim 5, wherein said cushion pad member includes a fragile portion, in the specified portion, that tears when the generated gas makes direct contact therewith, and said protective layer is formed over the entire inner surface of the cushion pad member except the fragile portion.

7. An occupant protection system according to claim 6, wherein said inflator includes a guide member for guiding the inflating gas towards the specified portion.

8. An occupant protection system according to claim 7, wherein said guide member is in the form of a box-shaped member surrounding the inflator and having a gas jet opening facing the fragile portion.

9. An occupant protection system according to claim 8, wherein said gas jet has an open edge in contact with the inner surface of the cushion pad member at the fragile portion.

10. An occupant protection system according to claim 8, wherein said guide member is shaped to guide the gas ejected from the inflator toward the fragile portion.

11. An occupant protection system of claim 1, wherein said impact is a side impact.

12. An occupant protection system of claim 1 wherein said seat covering member inflates between a body of the occupant and the body of the vehicle.

13. An occupant protection system of claim 12 wherein said seat covering member inflates between a head of the occupant and the body of the vehicle after inflating between the body of the occupant and the body of the vehicle.

14. An occupant protection system for a vehicle, comprising:

a cushion pad member having a fragile portion;

an inflator attached to the vehicle and disposed in one side of the cushion pad member, said inflator generating and discharging gas towards the fragile portion of said cushion pad member such that the generated gas makes direct contact with the fragile portion of said cushion member when said inflator is activated; and a covering member covering the other side of the cushion member including at least said fragile portion, wherein said covering member inflates between an occupant and the body of the vehicle by the gas generated by the inflator.

* * * * *